US007623732B1

(12) United States Patent
Thieret et al.

(10) Patent No.: US 7,623,732 B1
(45) Date of Patent: Nov. 24, 2009

(54) METHOD AND APPARATUS FOR DIGITAL IMAGE FILTERING WITH DISCRETE FILTER KERNELS USING GRAPHICS HARDWARE

(75) Inventors: Scott A. Thieret, Nashua, NH (US); Detlev Stalling, Berlin (DE); Malte Westerhoff, Berlin (DE)

(73) Assignee: Mercury Computer Systems, Inc., Chelmsford, MA (US)

( * ) Notice: Subject to any disclaimer, the term of this patent is extended or adjusted under 35 U.S.C. 154(b) by 663 days.

(21) Appl. No.: 11/411,999

(22) Filed: Apr. 26, 2006

Related U.S. Application Data

(60) Provisional application No. 60/675,067, filed on Apr. 26, 2005.

(51) Int. Cl.
*G06K 9/64* (2006.01)
(52) U.S. Cl. .................. 382/279; 382/260; 382/274; 382/275; 358/3.26; 358/3.27
(58) Field of Classification Search .......... 382/260, 382/274, 275; 358/3.26, 3.27, 463
See application file for complete search history.

(56) References Cited

U.S. PATENT DOCUMENTS

| | | | |
|---|---|---|---|
| 4,746,795 | A | 5/1988 | Stewart et al. |
| 4,984,160 | A | 1/1991 | Saint Felix et al. |
| 5,128,864 | A | 7/1992 | Waggener et al. |
| 5,218,534 | A | 6/1993 | Trousset et al. |
| 5,241,471 | A | 8/1993 | Trousset et al. |
| 5,253,171 | A | 10/1993 | Hsaio et al. |
| 5,287,274 | A | 2/1994 | Saint Felix et al. |

(Continued)

FOREIGN PATENT DOCUMENTS

DE 103 17 384 A1 4/2004

(Continued)

OTHER PUBLICATIONS

"ATI Website Index," http://www.ati.com/developer/index.html, 2 pages (Dec. 20, 2002).

(Continued)

*Primary Examiner*—Yosef Kassa
(74) *Attorney, Agent, or Firm*—Nutter McClennen & Fish LLP; David J. Powsner; Charlton Shen (57) ABSTRACT

The invention provides, in some aspects, methods and apparatus for signal and/or image processing which perform convolution-based filtering utilizing a graphics processing unit (GPU, also called "graphics card") to compute multiple output pixels at once. This has the advantage of saving memory bandwidth, while leveraging the GPUs vector multiplication and dot product units during the calculation. Related aspects of the invention provide such methods and apparatus in which multiple output pixels are computed simultaneously by using render targets with more than one channel, e.g., an RGBA render target, or multiple render targets, or a combination thereof. By way of non-limiting example, methods and apparatus according to the invention implement convolution on a GPU by executing the steps of defining input image I(x,y) as input texture of size $N_x \times N_y$; defining an RGBA render target (output) of size $N_x/4 \times N_y$; and, for each RGBA output pixel aggregating o(x,y) by (i) reading all input pixels I(x*4+i,y), with i=−4,0,4, and computing o(x,y) for the all four components of the output tuple.

29 Claims, 4 Drawing Sheets

U.S. PATENT DOCUMENTS

| | | | |
|---|---|---|---|
| 5,307,264 | A | 4/1994 | Waggener et al. |
| 5,375,156 | A | 12/1994 | Kuo-Petravic et al. |
| 5,412,703 | A | 5/1995 | Goodenough et al. |
| 5,412,764 | A | 5/1995 | Tanaka |
| 5,442,672 | A | 8/1995 | Bjorkholm et al. |
| 5,602,892 | A | 2/1997 | Llacer |
| 5,633,951 | A | 5/1997 | Moshfeghi |
| 5,671,265 | A | 9/1997 | Andress |
| 5,734,915 | A * | 3/1998 | Roewer ................ 715/202 |
| 5,813,988 | A | 9/1998 | Alfano et al. |
| 5,821,541 | A | 10/1998 | Tumer |
| 5,825,842 | A | 10/1998 | Taguchi |
| 5,909,476 | A | 6/1999 | Cheng et al. |
| 5,930,384 | A | 7/1999 | Guillemaud et al. |
| 5,931,789 | A | 8/1999 | Alfano et al. |
| 5,960,056 | A | 9/1999 | Lai |
| 5,963,612 | A | 10/1999 | Navab |
| 5,963,613 | A | 10/1999 | Navab |
| 5,963,658 | A | 10/1999 | Klibanov et al. |
| 6,002,739 | A | 12/1999 | Heumann |
| 6,018,562 | A | 1/2000 | Willson |
| 6,044,132 | A | 3/2000 | Navab |
| 6,049,582 | A | 4/2000 | Navab |
| 6,088,423 | A | 7/2000 | Krug et al. |
| 6,108,007 | A | 8/2000 | Shochet |
| 6,108,576 | A | 8/2000 | Alfano et al. |
| 6,264,610 | B1 | 7/2001 | Zhu |
| 6,268,846 | B1 | 7/2001 | Georgiev |
| 6,282,256 | B1 | 8/2001 | Grass et al. |
| 6,289,235 | B1 | 9/2001 | Webber et al. |
| 6,304,771 | B1 | 10/2001 | Youdh et al. |
| 6,320,928 | B1 | 11/2001 | Vaillant et al. |
| 6,324,241 | B1 | 11/2001 | Besson |
| 6,377,266 | B1 | 4/2002 | Baldwin |
| 6,404,843 | B1 | 6/2002 | Vaillant |
| 6,415,013 | B1 | 7/2002 | Hsieh et al. |
| 6,470,067 | B1 | 10/2002 | Harding |
| 6,475,150 | B2 | 11/2002 | Haddad |
| 6,507,633 | B1 | 1/2003 | Elbakri et al. |
| 6,510,241 | B1 | 1/2003 | Vaillant et al. |
| 6,519,355 | B2 | 2/2003 | Nelson |
| 6,615,063 | B1 | 9/2003 | Ntziachristos et al. |
| 6,636,623 | B2 | 10/2003 | Nelson et al. |
| 6,697,508 | B2 | 2/2004 | Nelson |
| 6,707,878 | B2 | 3/2004 | Claus et al. |
| 6,718,195 | B2 | 4/2004 | Van Der Mark et al. |
| 6,731,283 | B1 | 5/2004 | Navab |
| 6,741,730 | B2 | 5/2004 | Rahn et al. |
| 6,744,253 | B2 | 6/2004 | Stolarczyk |
| 6,744,845 | B2 | 6/2004 | Harding |
| 6,745,070 | B2 | 6/2004 | Wexler et al. |
| 6,747,654 | B1 | 6/2004 | Laksono et al. |
| 6,754,299 | B2 | 6/2004 | Patch |
| 6,765,981 | B2 | 7/2004 | Heumann |
| 6,768,782 | B1 | 7/2004 | Hsieh et al. |
| 6,770,893 | B2 | 8/2004 | Nelson |
| 6,771,733 | B2 | 8/2004 | Katsevich |
| 6,778,127 | B2 | 8/2004 | Stolarczyk et al. |
| 6,919,892 | B1 * | 7/2005 | Cheiky et al. ............ 345/473 |
| 7,006,881 | B1 * | 2/2006 | Hoffberg et al. ............ 700/83 |
| 7,027,662 | B2 * | 4/2006 | Baron ................ 382/275 |
| 7,180,074 | B1 * | 2/2007 | Crosetto ............ 250/370.09 |
| 2001/0026848 | A1 | 10/2001 | Van Der Mark et al. |
| 2002/0099290 | A1 | 7/2002 | Haddad |
| 2002/0123680 | A1 | 9/2002 | Vaillant et al. |
| 2002/0138019 | A1 | 9/2002 | Wexler et al. |
| 2002/0150202 | A1 | 10/2002 | Harding et al. |
| 2002/0150285 | A1 | 10/2002 | Nelson |
| 2003/0031352 | A1 | 2/2003 | Nelson et al. |
| 2003/0065268 | A1 | 4/2003 | Chen et al. |
| 2003/0103666 | A1 | 6/2003 | Edic et al. |
| 2003/0123720 | A1 | 7/2003 | Launay et al. |
| 2003/0194049 | A1 | 10/2003 | Claus et al. |
| 2003/0220569 | A1 | 11/2003 | Dione et al. |
| 2004/0010397 | A1 | 1/2004 | Barbour et al. |
| 2004/0015062 | A1 | 1/2004 | Ntziachristos et al. |
| 2004/0022348 | A1 | 2/2004 | Heumann |
| 2004/0066891 | A1 | 4/2004 | Freytag et al. |
| 2004/0102688 | A1 | 5/2004 | Walker et al. |
| 2004/0125103 | A1 | 7/2004 | Kaufman et al. |
| 2004/0147039 | A1 | 7/2004 | Van Der Mark et al. |
| 2004/0162677 | A1 | 8/2004 | Bednar et al. |
| 2005/0152590 | A1 | 7/2005 | Thieret et al. |
| 2005/0270298 | A1 | 12/2005 | Thieret |

FOREIGN PATENT DOCUMENTS

| | | |
|---|---|---|
| EP | 0 492 897 A3 | 7/1992 |
| EP | 0 502 187 B1 | 9/1992 |
| EP | 0 611 181 A1 | 8/1994 |
| EP | 0 476 070 B1 | 8/1996 |
| EP | 0 925 556 B1 | 6/1999 |
| EP | 0 953 943 A2 | 11/1999 |
| EP | 0 964 366 A1 | 12/1999 |
| EP | 1 087 340 A1 | 3/2001 |
| EP | 00953943 A1 | 7/2004 |
| WO | WO 90/16072 | 12/1990 |
| WO | WO 91/02320 | 2/1991 |
| WO | WO 92/05507 | 4/1992 |
| WO | WO 92/05507 A1 | 4/1992 |
| WO | WO 96/42022 | 12/1996 |
| WO | WO 98/10378 | 3/1998 |
| WO | WO 98/12667 | 3/1998 |
| WO | WO 98/33057 | 7/1998 |
| WO | WO 01/20546 | 3/2001 |
| WO | WO 01/34027 | 5/2001 |
| WO | WO 01/63561 | 8/2001 |
| WO | WO 01/63561 A1 | 8/2001 |
| WO | WO 01/74238 | 10/2001 |
| WO | WO 01/85022 | 11/2001 |
| WO | WO 02/41760 | 5/2002 |
| WO | WO 02/067201 | 8/2002 |
| WO | WO 02/082065 | 10/2002 |
| WO | WO 03/061454 | 7/2003 |
| WO | WO 03/088133 | 10/2003 |
| WO | WO 03/090171 | 10/2003 |
| WO | WO 03/098539 | 11/2003 |
| WO | WO 2004/019782 | 3/2004 |
| WO | WO 2004/020996 | 3/2004 |
| WO | WO 2004/020997 | 3/2004 |
| WO | WO 2004/034087 A2 | 4/2004 |
| WO | WO 2004/044848 A1 | 5/2004 |
| WO | WO 2004/066215 A1 | 8/2004 |
| WO | WO 2004/072906 A1 | 8/2004 |

OTHER PUBLICATIONS

Cabral et al., "Accelerated Volume Rendering and Tomographic Reconstruction Using Texture Mapping Hardware", Silicon Graphics Computer Systems, IEEE, pp. 91-97 (1995).

Chidlow et al, "Rapid Emission Tomography Reconstruction," Proceedings of the 2003 Eurographics/IEEE TVCG Workshop on Volume Graphics, Tokyo, Japan, 13 pages (Jul. 7-8, 2003).

Cohen, M. et al., "A Progressive Refinement Approach to Fast Radiosity Image Generation," Computer Graphics, 22(4):75-84 (Aug. 1988).

Corner, University of Nebraska-Linolcn, MatLab.txt 1 page (2003).

Dachille, et al., "High-Quality Volume Rendering Using Texture Mapping Hardware," Siggraph/Eurographics Hardware Workshop, 8 pages (1998).

Dempster at al., "Maximum Likelihood From Incomplete Data Via The EM Algorithm", Harvard University and Educational Testing Service, pp. 1-38 (Dec. 8, 1976).

Dobbins et al., "Digital X-Ray Tomosynthesis: Current State of the Art and Clinical Potential," Physics in Medicine and Biology, 48:R65-R106 (2003).

Doggett, M., ATI, Programmability Features of Graphics Hardware, (paper), pp. C1-C22 (Apr. 23, 2002).

Doggett, M., ATI, Programmability Features of Graphics Hardware, (slideshow) slides 1-62, 31 pages.

"Filtered Backprojection Reconstruction", http://www.physics.ubd.ca/~mirg/home/tutorial/fbp_recon.html, Feb. 6, 2003, 5 pages.

Hadwiger, M. et al., "Hardware-Accelerated High-Quality Reconstruction of Volumetric Data on PC Graphics Hardware," VRVis Research Center, Vienna, Austria, and Institute of Computer Graphics and Algorithms, Vienna University of Technology, Austria, 9 pages.

Hopf, M. et al., "Accelerating 3D Convolution using Graphics Hardware," Proc. IEEE Visualization, 5 pages (1999).

Hudson et al., "Accelerated Image Reconstruction Using Ordered Subsets of Projection Data", IEEE Transactions on Medical Imaging, 13(4):601-609 (Dec. 1994).

"Image Registration Slideshow", 105 pages.

Jain, A., "A Programmable Graphics Chip," pcquest.com (Jun. 18, 2001).

Jones et al., "Positron Emission Tomographic Images and Expectation Maximization: A VLSI Architecture For Multiple Iterations Per Second", Computer Technology and Imaging, Inc., IEEE, pp. 620-624 (1988).

Kajiya, J. T., "Ray Tracing Volume Densities," Proc. SIGGRAPH, Jul. 1984, Computer Graphics, 18(3):165-174 (Jul. 1984).

Kruger, J, et al., "Acceleration Techniques for GPU-based Volume Rendering," Proceedings of IEEE Visualization, 6 pages (2003).

Lange et al., "EM Reconstruction Algorithms For Emission And Transmission Tomography," J Computer Assisted Tomography 8:306 et seq. (1984).

Lange et al., "Globally Convergent Algorithms for Maximum a Posteriori TransmissionTomography," IEEE Transactions on Image Processing, 4(10):1430-1438 (Oct. 1995).

Li et al., "Tomographic Optical Breast Imaging Guided by Three-Dimensional Mammography," Applied Optics, 42(25):5181-5190 (Sep. 1, 2003).

Max, N., "Optical Models for Direct Volume Rendering," IEEE Transactions On Visualization and Computer Graphics, I(2):99-108 (Jun. 1995).

McCool, M.J., "Smash: A Next-Generation API for Programmable Graphics Accelerators," Technical Report CS-200-14, Computer Graphics Lab Dept. of Computer Science, University of Waterloo (Aug. 1, 2000).

Microsoft.com, from "http://msdn.microsoft.com/library/default.asp?url=/library/en-us/dx8_c/directx_cpp/Graphics/ProgrammersGuide/GettingStarted/Architecture," 22 pages (Dec. 20, 2002).

Mitchell, J.L., "RadeonTM 9700 Shading," SIGGRAPH 2002—State of the Art in Hardware Shading Course Notes, pp. 3.1-1-3.1-39, 39 pages.

Mueller, K. et al. "Rapid 3-D Cone Beam Reconstruction with the Simultaneous Algebraic Reconstruction Technique (SART) Using 2-D Texture Mapping Hardware", IEEE Transactions on Medical Imaging, 19(12): 1227-1237 (Dec. 2000).

"Overview of X-Ray Computed Tomography," http://www.howstuffworks.com/framed.htm?parent=c...tm&url=http://www.ctlab.geo.utexas.edu/overview/, 5 pages (Dec. 26, 2002).

Pfister, H. et. al., "The VolumePro Real-Time Ray-Casting System," Computer Graphics (Proceedings of SIGGRAPH), pp. 251-260 (Aug. 1999).

Phong, B.T., "Illumination for Computer Generated Pictures," Communications of the ACM, 18(6):311-317 (Jun. 1975).

Purcell, T., et. al., "Ray Tracings on Programmable Graphics Hardware," Computer Graphics (Proceedings of SIGGRAPH), pp. 703-712 (1998).

"Rib Cage Projection," http://www.colorado.edu/physics/2000/tomography/final_rib_cage.html, 3 pages (Dec. 26, 2002).

Roettger, S. et al., "Smart Hardware-Accelerated Volume Rendering," Joint Eurographics—IEEE TCVG Symposium on Visualization, pp. 231-238, 301 (2003).

Sandborg, M., "Computed Tomography: Physical Principles and Biohazards," Department of Radiation Physics, Faculty of Health Sciences, Linkoping University, Sweden, Report 81 ISSN 1102-1799, ISRN ULI-RAD-R—81—SE, 18 pages (Sep. 1995).

Selldin, H., "Design and Implementation of an Application Programming Interface for Volume Rendering," Linkopings Universitet.

"Technical Brief: NVIDIA nfiniteFX Engine: Programmable Pixel Shaders," NVIDIA Corporation, 5 pages.

"Technical Brief: NVIDIA nfiniteFX Engine: Programmable Vertex Shaders," NVIDIA Corporation, 12 pages.

Viola, "Alignment by Maximization of Mutual Information," PhD Thesis MIT (Also Refered To As—"AI Technical report No. 1548"), MIT Artificial Intelligence Lab, pp. 1-29 (Jun. 1, 1995).

Viola, I. et al., "Hardware Based Nonlinear Filtering and Segmentation Using High Level Shading Languages," Technical Report TR-186-2-03-07, 8 pages (May 2003).

Wu et al., "Tomographic Mammography Using A Limited Number of Low-Dose Conebeam Projection Images," Med. Phys., pp. 365-380 (2003).

* cited by examiner

METHOD AND APPARATUS FOR DIGITAL IMAGE FILTERING WITH DISCRETE FILTER KERNELS USING GRAPHICS HARDWARE

CROSS REFERENCE TO RELATED APPLICATIONS

This application claims the benefit of a U.S. Provisional Patent Application Ser. No. 60/675,067, filed Apr. 26, 2005, the teachings of which are incorporated herein by reference.

BACKGROUND OF THE INVENTION

The invention pertains to digital data processing and, more particularly, to image and signal processing and, still more particularly, by way of non-limiting example, to image processing operations that are based on convolution. The invention has application, by way of non-limiting example, in medical imaging, microscopy, and geo-sciences, to name but a few fields.

Convolution is an important image and signal processing operation. It is used, for example, in image reconstruction, image enhancement, and feature detection, among other critical operations. A formal statement of the challenge faced by designers of image and signal processing that perform convolution is as follows.

Given a digital image of size $N_x \times N_y$ $I(x,y)$, $x=0, \ldots, N_x-1$, $y=0, \ldots, N_y-1$, and a discrete filter kernel $K(x,y)$, $x=0, \ldots, N_x^K-1$, $y=0, \ldots, N_y^K-1$ of size $N_x^K \times N_y^K$, convolve or filter the image with that discrete filter kernel in accord with the formula:

$$o(x, y) = \sum_{i=0}^{N_x^K-1} \sum_{j=0}^{N_y^K-1} K(i, j) I\left(x + i - \left\lfloor \frac{N_x^K - 1}{2} \right\rfloor, y + j - \left\lfloor \frac{N_y^K - 1}{2} \right\rfloor\right) \quad (1)$$

This formula evaluates the digital image outside its domain to compute output values near the boundaries. Depending on the application, different approaches for the boundary treatment may be chosen including defining pixels outside the domain to be a constant value, mirroring of the image, wrapping around or constant continuation.

For sake of simplicity, the challenge or problem statement, above, is expressed with respect to 2D images, as is (again, for sake of simplicity) much of the discussion in the sections below. However, as will be appreciated from the text below, both the challenge and the inventive solutions provided hereby can be applied to 1D as well as 3D or higher dimensions.

In view of the foregoing, an object of the invention is to provide improved methods and apparatus for digital data processing and particularly, for example, for image and signal processing.

A further object of the invention is to provide such methods and apparatus as provide improved performance of image and signal and signal processing operations based on convolution. A related object of the invention is to provide such methods and apparatus as provide for convolution or filtering of digital image data with discrete kernels.

Yet further objects of the invention are to provide such methods and apparatus as can be implemented at lower cost and, yet, as provide optimal performance.

A related object of the invention is to provide such methods and apparatus as can be implemented using standard, off-the-shelf components.

SUMMARY OF THE INVENTION

The foregoing are among the objects attained by the invention, which provides, in some aspects, methods and apparatus for signal and/or image processing which perform convolution-based filtering utilizing a graphics processing unit (GPU, also called "graphics card") to compute multiple output pixels at once. This has the advantage of saving memory bandwidth, while leveraging the GPUs vector multiplication and dot product units during the calculation.

Related aspects of the invention provide such methods and apparatus as are implemented on a GPU having programmable vertex shaders and programmable pixel shaders. Further related aspects of the invention provide such methods and apparatus in which multiple output pixels are computed simultaneously by using render targets with more than one channel, e.g., an RGBA render target, or multiple render targets, or a combination thereof.

Further aspects of the invention provide such methods and apparatus wherein a filter implemented on such a GPU performs convolution with a 9×1 kernel, by way of non-limiting example, by executing the steps of defining input image $I(x,y)$ as input texture of size $N_x \times N_y$; defining an RGBA render target (output) of size $N_x/4 \times N_y$; and, for each RGBA output pixel aggregating $o(x,y)$ by (i) reading all input pixels $I(x*4+i,y)$, with $i=-4,0,4$, and computing $o(x,y)$ for the all four components of the output tuple.

Still further related aspects of the invention provide such methods and apparatus wherein the GPU is utilized to multiply two four-vectors and add the result to another four-vector in one operation. In these and other aspects of the invention, the input can be packed into RGBA (or other) tuples thereby saving read operations.

According to further related aspects of the invention, methods and apparatus as described above can store the filter kernel as constants in registers in pixel shaders of the GPU. Alternatively, or in addition, the kernel can be stored in a separate texture.

Further aspects of the invention provide methods and apparatus as described above in which output aggregation varies with kernel size, GPU hardware and/or driver software selection (e.g., maximum number of simultaneous outputs supported, maximum number of instructions allowed in a pixel shader, and/or maximum number of constants or registers available to store the kernel values, among other factors).

Yet other aspects of the invention provide methods and apparatus as described above which computes 1D convolutions, as well as 3D and higher-order convolutions. Such methods and apparatus for 1D convolutions can, by way of example, store multiple lines in one input image and, then, to process that image in the manner described above as a convolution of a 2D input image with a 1D kernel. Such methods and apparatus for 3D convolutions can use correspondingly dimensioned input texture and/or, alternatively, of a set of n lower dimensional textures. Still further, multiple slices of a volume can be packed into a lower dimensional texture in a tile-like fashion.

Yet still other aspects of the invention provide such methods and apparatus as provide optimized filtering using separable kernels. This can be achieved, for example, by using the results of row-wise convolutions as inputs to column-wise convolution and, more particularly, by treating convolution with the 2D filter kernel as equivalent to a 1D convolution of the rows of the image with $K_x(\cdot)$, followed by a 1D convolution of the columns with $K_y(\cdot)$, where those 1D convolutions are executed as described above.

In further related aspects of the invention, such methods and apparatus further optimize filtering with separable kernels by first computing the row-wise convolution, transposing the image, then performing a second row-wise convolution with $K_y$, followed by another transpose operation.

Still further aspects of the invention provide methods and apparatus of signal and/or image processing which perform convolutions involving constant filter kernels. Such methods and apparatus capitalize on the separable nature of constant filter kernels by implementing a recursive computation methodology (e.g., a "box car convolution"), e.g., on a GPU with programmable vertex shaders and programmable pixel shaders, yet, ensuring correct order of processing.

Related aspects of the invention provide such methods and apparatus as, in effect, draw vertical lines from left to right covering one column of the render target each. More particularly, these execute the steps of defining image I(x,y) as input texture $N_x \times N_y$; defining a render target (output) of same size; defining render target as second input texture; initializing column 0 (leftmost) of render target with correct output values; for column 1 ... $N_x-1$: for each pixel o(x,y) in that column read value o(x−1,y) from render target (second input texture); read $$i_1 = I\left(x + \left\lfloor \frac{N_x^K}{2} \right\rfloor, y\right)$$

and $$i_2 = I\left(x - 1 - \left\lfloor \frac{N_x^K - 1}{2} \right\rfloor, y\right);$$

write out o(x,y)=o(x−1,y)+$i_1$−$i_2$.

Related aspects of the invention provide methods and apparatus as described above in which orderly processing order of pixels by the GPU is ensured by one or more of the following: sending a "flush" command after each line drawn; inserting "fence tokens" into the stream of commands sent to the GPU and querying for their them; using multiple render targets and swapping them after each line is drawn; correcting sporadically miscalculated pixels in subsequent render passes; issuing dummy geometry after each line; working with multiple advancing fronts.

Still further aspects of the invention provide methods and apparatus as described above in which parallelization in the GPU is exploited for efficiency by, instead of initializing the left-most column, initializing multiple columns spread across the image. Recursive computation is performed by drawing lines advancing from these seedlines.

Yet still further aspects of the invention provide methods and apparatus as described above in which hardware filtering on the GPU is utilized to decrease the number of instructions in the convolution filter code, leveraging additional hardware in the graphics device and further accelerating the filtering process. In related aspects of the invention, this additional filtering is carried out in parallel with calculations occurring within the pixel shaders. As a result, by way of example, according to some aspects of the invention, an entire 1D convolution can be calculated in a single pass.

Further aspects of the invention provide methods and apparatus as described above in which the operations ascribed above to a single GPU are carried out by multiple GPUs or other processing elements (such as array processors, game engine processors, and so forth).

These and other aspects of the invention are evident in the drawings and in the text that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Described below are methods and apparatus according to the invention which perform convolution filtering of signal and image data by utilizing a graphics processing unit (GPU, also called "graphics card") to compute multiple output pixels at once, thereby saving memory bandwidth and leveraging the GPUs vector multiplication and dot product units during the calculation. Also described are methods and apparatus according to the invention which implement the well known "box car" convolution on a GPU for the special case of a constant filter.

The methods and devices described herein have numerous applications, for example, in medical imaging such as computed tomography (CT), position emission tomography (PET), single photon emission computed tomography (SPECT), and other medical applications. Non-medical applications, not limited to examples such as geo-sciences, microscopy, general computer tomography and confocal microscopy, can also utilize aspects of the present invention.

Such methods can be implemented in an imaging and digital processing environment of the type disclosed in copending, commonly assigned U.S. patent application Ser. No. 10/756,172, filed Jan. 12, 2004, entitled Improved Methods and Apparatus for Back-Projection and Forward-Projection, and specifically, in FIG. 1 thereof and the corresponding text, e.g., at page 7, line 14 through page 8, line 26, the teachings (including illustration) of which are incorporated herein by reference. Although that figure and the text refer, by way of example, to mammography systems and computed tomosynthesis, it will be appreciated that the invention hereof and its embodiments are more broadly applicable to the full range of medical (and non-medical) imaging applications and techniques, such as, by way of non-limiting example, geo-sciences, or microscopy, computer tomographs, magnetic resonance imaging devices, or confocal microscopes, to name just a few.

It will be further appreciated that methods as described above, when implemented in an imaging and digital processing environment of the type disclosed in the aforementioned incorporated-by-reference application, form apparatus according to practice of the present invention.

Figure 1:
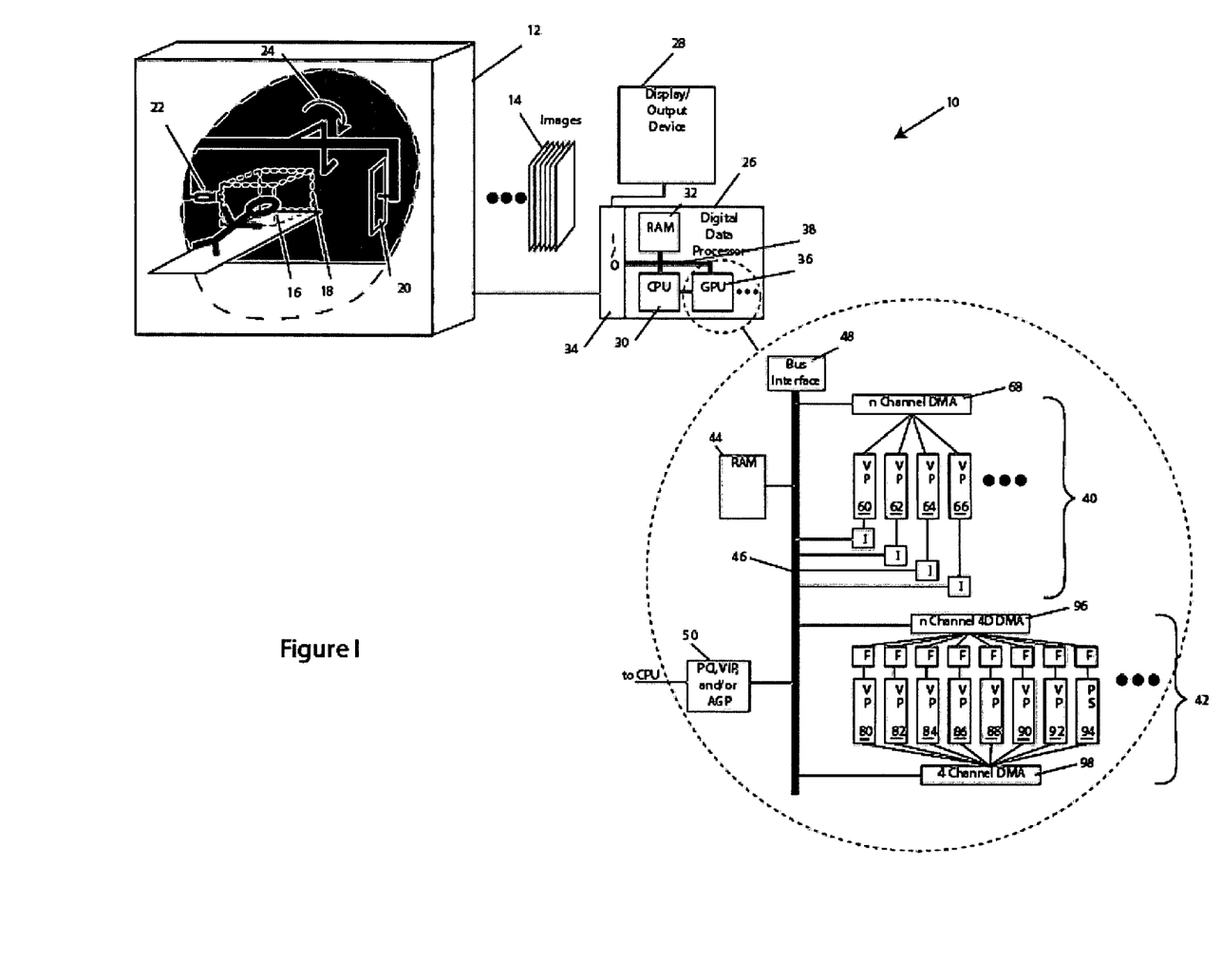
FIG. 1 depicts a computed aided tomography system of the type with which the present invention can be practiced.

In view of the foregoing, FIG. 1 depicts—by way of non-limiting example—a computer aided tomography system 10 of the type with which the invention can be practiced and forming apparatus according to the invention.

The system 10 includes an image acquisition apparatus 12 that generates multiple projection images 14 of an object 16 in a volume 18. In the illustrated system, this is accomplished in the conventional manner, e.g., by illuminating the object 16 with radiation from a source 22 and detecting by a detector 20, such as a charged-coupled device or other 2D sensor array, radiation not absorbed by the object 16. Generally, multiple projection images obtained at different respective angles are required for reconstructing a three-dimensional representation of the object. Such projection images can be captured by moving the source and/or the detector around the volume 16 to illuminate the object from different angles and to detect a portion of the illuminating radiation that is not absorbed by the object.

In the system of FIG. 1, those projections can be generated in accord with the principles of computed tomography (CT), i.e., with the source 22 at discrete foci on an arc 24 that completely surrounds the volume 18. Alternatively, those projections can be generated in accord with principles of computed tomosynthesis, i.e., with the source 22 at discrete foci along a smaller arc above the object. For example, the radiation source can be an x-ray source and the detector 22 is an x-ray detector, both mounted at opposite ends of a C-arm that rotates about the volume 18. The rotatable C-arm is a support structure that allows rotating the source 22 and the detector 20 around the volume 18, e.g., a long a substantially circular arc, to capture a plurality of projection images of the object 16 at different angels. It should, however, be understood that the teachings of the present invention can be applied in a multitude environments, of which the foregoing are merely examples.

Figure 2A:
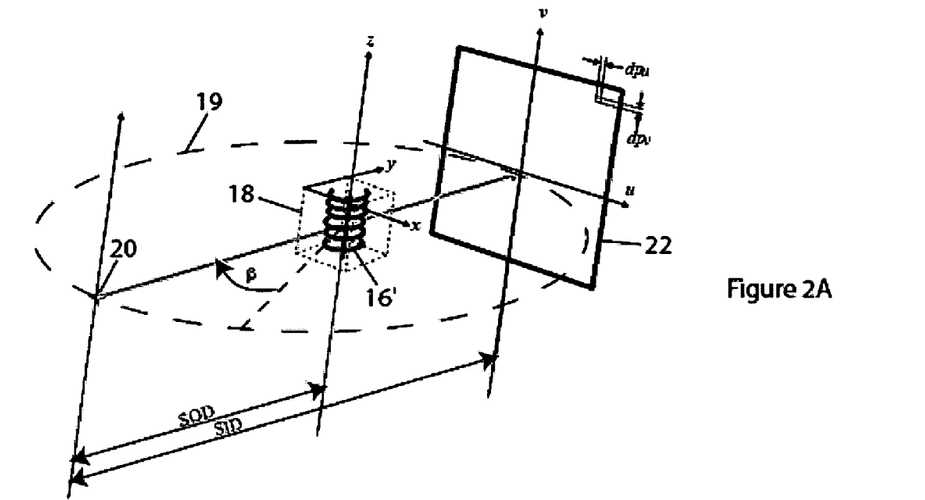
FIGS. 2A and 2B schematically depict generation of projection images of the type that can be reconstructed using, inter alia, methods and apparatus according to the invention.
Figure 2B:
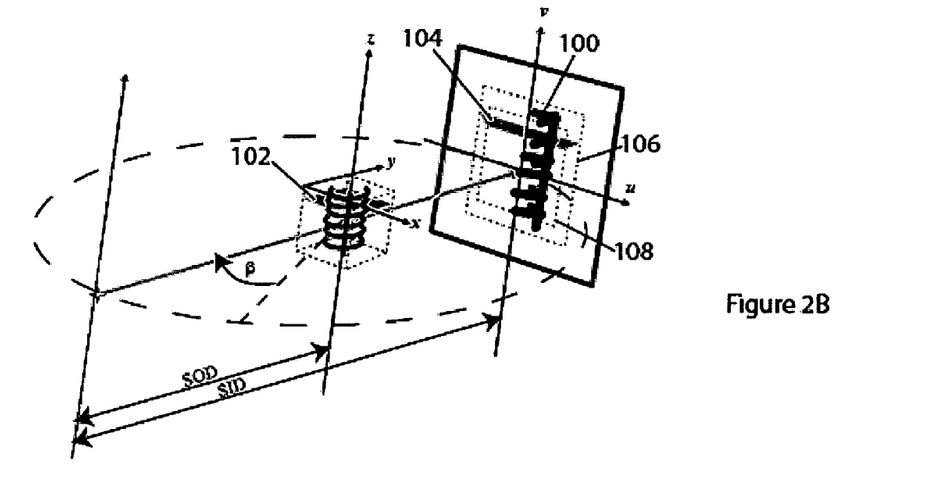

To continue those examples, however, FIGS. 2A and 2B schematically depict generation of a measured projection image by apparatus 12 of a volume 18 containing a rib cage 16'. X-ray radiation emitted by the source 20, shown at one of its axial positions β as it rotates about the volume 18 during a scanning operation, travel through the imaged volume 18. A portion of the x-ray radiation not absorbed by the imaged volume impinges on the detector array 22, depicted opposite source 20 vis-à-vis the volume 18, as the detector moves about the volume 18 in tandem with the source. The volume 18 is characterized by x, y and z axes, as indicated, and the detector 22 and, specifically, the imaging portion thereof, is characterized by u and v axes defining an imaging or detection plane that is parallel to the axis of rotation (i.e., the z-axis) and has a normal perpendicular to a tangent of the rotational path 19. Referring to FIG. 2B, the imaging arrangement of FIG. 2A is shown with the additional superposition on detector 22 of an image 100 of the type generated by projection of x-ray radiation from the source 20 through the rib cage 16'. As evident in the drawing, the image 100 is a silhouette or, as more often referred to herein, a "projection" or a "projection image," e.g., in the nature of a conventional x-ray image. The projected images 100 provide digital image data from which a reconstructed volume is obtained.

Referring again to FIG. 1, the system 10 further includes a digital data processor 26 that analyzes the images 14 to "reconstruct" the volume 18—and, more specifically, to generate a three-dimensional representation of the contents of that volume, e.g., the object 16, (or a portion thereof) in a manner discussed in more detail below. Illustrated object 16 is the head of a human patient. However, the invention can be used in analyzing images of other objects, biological, archeological, industrial, or otherwise.

Reconstruction of the volume from the projected images can be achieved by a number of mathematical reconstruction techniques. One non-limiting example is filtered back projection. In this technique, the various projections are summed with a weighting factor that acts to "filter" artifacts. In such an instance, Equation (1) can be used to implement the filtering, with $I(x,y)$ acting as the projection image data and $K(x,y)$ being the filtering function. Accordingly, embodiments of the present invention can be utilized to perform the filtered back projection operation; however, as noted previously, embodiments of the invention can be applied in a variety of other imaging operations—for reconstruction or otherwise.

Illustrated digital data processor 26 is a workstation, personal computer, mainframe, or other general or special-purpose computing device of the type conventionally known in the art, albeit adapted as discussed below for processing projections 14, including exercise of method and apparatus for convolution according to the invention. As shown in the drawing, it includes a central processing unit (CPU) 30, dynamic memory (RAM) 32, and I/O section 34, all of the type conventionally known the art. The digital data processor 26 may be coupled, via I/O section 34, with a monitor or other graphical display or presentation device 28, as shown.

Illustrated digital data processor 26 also includes a graphical processing unit (GPU) 36 that is coupled to the CPU 30, through which it can access the other elements of the digital data processor 26, as shown. In one embodiment, the GPU 36 serves as a coprocessor, operating under the control of the CPU 30 to convolve the imaging data, e.g., while reconstructing the volume 18 from the measured projection images. Other embodiments of the invention employ multiple GPUs for this purpose, each responsible for a respective portion of the convolution process. The GPU 30 is preferably of the variety having programmable vertex shaders and programmable pixel shaders that are commercially available from ATI research (for example, the Radeon™ 9700 processor), NVIDIA (for example, the GeForce™ FX and Quadro® processors). However, it will be appreciated that the invention can be practiced with processing elements other than commercially available GPUs. Thus, for example, it can be practiced with commercial, proprietary or other chips, chipsets, boards and/or processor configurations that are architected in the manner of the GPUs (e.g., as described below). It can also be practiced on such chips, chipsets, boards and/or processor configurations that, though of other architectures, are operated in the manner of GPUs described herein.

Components of the digital data processor 26 are coupled for communication with one another in the conventional manner known in the art. Thus, for example, a PCI or other bus 38 or backplane (industry standard or otherwise) may be provided to support communications, data transfer and other signaling between the components 30-36. Additional coupling may be provided among and between the components in the conventional manner known in the art or otherwise.

A typical architecture of the GPU 36 suitable for use in the practice of the invention is shown by way of expansion graphic in FIG. 1. The GPU 36 includes a geometrical mapping section 40 and a pixel processing section 42 interconnected with one another, as well as with a local memory 44, by way of a bus 46. The GPU communicates with other components of the digital data processor by interfacing with the bus 38 via a bus interface 48. A further interface 50 is provided between the bus 46 and the CPU 30 by way of one or more interfaces of the type standard in the art, or otherwise, for CPU/GPU intercommunication. In the illustrated embodiment, that further interface 50 is a VIP (video input port)

interface, and AGP (accelerated graphics port) interface or otherwise, as conventionally known in the art or otherwise.

Local memory 44 supports both the short-term and long-term storage requirements of the GPU 36. For example, it can be employed to buffer the projection image data 14, iterative estimates of the density distribution of the volume under reconstruction, forward-projection images generated based on those estimates as well as parameters, constants and other information (including programming instructions for the vector processors that make up the mapping and pixel processing sections).

In the illustrated embodiment, the mapping section 40 comprises a plurality of programmable vertex shaders 60-66 that generate mappings between the coordinate space of the projection images and that of the volume 18. For example, the vertex shaders map each pixel in a projection image to one or more voxels in the volume. The pixel processing section comprises a plurality of pixel shaders 80-94 that can adjust pixel intensities in forward-projection images generated from estimates of the density distributions of the volume, e.g., based on comparison of the forward-projection images with respective measured projection images, and to modify density values of voxels in the volume to reflect back-projection of those forward-projection images, as discussed in more detail below.

DMA engines 68 and 96 provide coupling between the local bus 46 and, respectively, the vertex shaders 60-66 and pixel shaders 80-94, facilitating access by those elements to local memory 44, interfaces 48, 50, or otherwise. A further DMS engine 98 provides additional coupling between the pixel shaders 80-94 and the bus 46. In addition, filters (labeled "F") are coupled between the DMA engine 96 and the pixel shaders 80-94, as illustrated. These perform interpolation, anisotropic filtering or other desired functions. Also coupled to the vertex shaders 60-66 are respective iterators (labeled "I"), as illustrated. Each iterator generates addresses (in volume space) for the voxels defined by the corresponding vertex shaders 60-66.

With this context, described below are methods for operation of GPU 36 or other suitable processing elements, as described above. Those skilled in the art will appreciate how the elements referred to in the discussion below map to elements of the GPU (as well as to corresponding components of other suitable processing elements).

Example Case: 9×1 Filter

We first describe a simplistic implementation of a convolution filter on a GPU for the special case of a filter kernel with dimensions 9×1. Similar simplistic implementations have been proposed in the prior art. We then explain how systems and methods according to the invention implement the filter differently, thus, highlighting its operation and innovations. Then we explain the generalisation to other kernel.

Simplistic convolution on GPU can be accomplished as follows:

1. Define image I(x,y) as input texture of size $N_x \times N_y$.
2. Define a render target (output) of same size
3. For each output pixel o(x,y)
   a. Read all pixels I(x+i,y), with i=−4, −3, −2, −1, 0, 1, 2, 3, 4
   b. Compute o(x,y) according to Equation (1) with appropriate weights Convolution According to Practices of the Invention In contrast, systems and methods according to the invention utilize a convolution filter with a significantly more efficient implementation. Thus, for example, that filter computes multiple output pixels at once. This can be realized by using render targets with more than one color channel, e.g., an RGBA render target, or multiple render targets, or a combination thereof.

Figure 3:
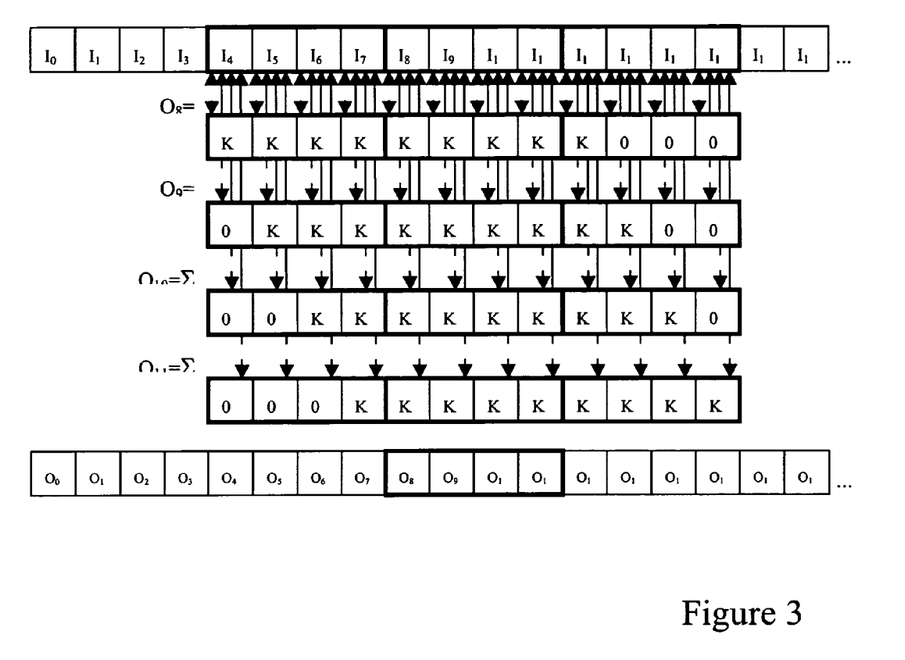
FIG. 3 is an example of a 9×1 convolution illustrating benefits of a method according to the invention.

Continuing the above example, a filter according to the invention utilizing a 9×1 kernel can be implemented on a GPU (e.g., GPU 36) for fast convolution by executing the steps of:

1. Define image I(x,y) as input texture of size $N_x \times N_y$.
2. Define an RGBA render target (output) of size $N_x/4 \times N_y$.
3. For each RGBA output pixel aggregate o(x,y)
   a. Read all input pixels I(x*4+i,y), with i=−4,0,4
   b. Compute o(x,y) for the all four components of the output RGBA tuple FIG. 3 illustrates this example of a 9×1 convolution illustrating benefits of such a method according to the invention. The top row depicts a part of the first row of the input image. In order to compute a certain four-tuple of output values (in the example O8, . . . , O11), twelve input values are required. For each of the four outputs, nine of these twelve input values need to be multiplied with the respective kernel values and summed.

Modern GPU hardware, that is, graphics processing units having programmable vertex shaders and programmable pixel shaders (e.g., the offerings of ATI Research and Nvidia referred to in incorporated-by-reference U.S. patent application Ser. No. 10/756,172, or otherwise described in that application), are beneficially employed in systems and methods according to the invention to multiply two four-vectors and add the result to another four-vector in one operation (MAC). Thus the computation of one output value only requires three such operations plus one dot-product with a four-vector of ones to perform the final sum. As a further optimization, the input can be packed into RGBA tuples, as depicted in FIG. 3, thereby saving read operations (not decreasing memory bandwidth though).

Figure 4:
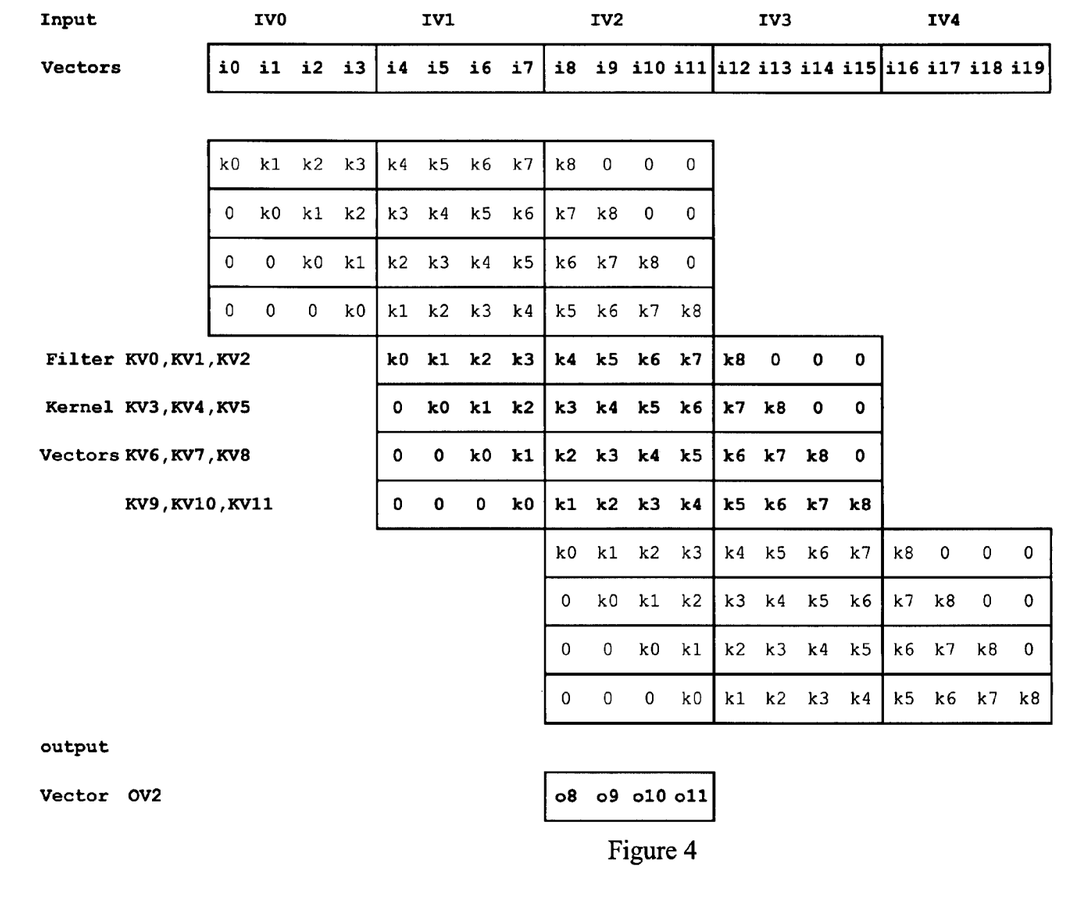
FIG. 4 provides a further illustration of aspects of the example of FIG. 3.

Aspects of the example of FIG. 3 can be further interpreted with reference to FIG. 4. Considering the case where the value of y is set at some particular value Y, each input data point I(x,Y) can be denoted as ix (e.g., i0, i1, i2, . . . ). In this example, the component filter values of the 9×1 filter can be denoted k0, k1, k2, . . . , k7, k8.

To calculate the output data points corresponding to o8, o9, o10, and o11, Equation (1) can be applied to give the following relationship in terms of the scalar input data points, filter values, and scalar output data points:

$$ox = \sum_{j=0}^{8} i(x - 4 + j)kj$$

The output data points can also be calculated using vector operations, as employed with by a GPU for example. The input data points can be arranged as input vectors IV0, IV1, IV2, . . . , where each input vector IVj has 4 corresponding input data points: [iv(4*j), iv(4*j+1), iv(4*j+2), iv(4*j+3)]. As well, the filter values that are used to convolute the input data points can also be arranged in a set of filter vectors KV0, KV1, KV2, . . . , KV10, KV11, where each filter vector has four components given as shown in FIG. 4. Using these input and filter vectors, the output data points o8, 09, 010, and 011 can be obtained by generating corresponding temporary vectors TV8, TV9, TV10, and TV11. All the necessary input data points i4, i5, i6, . . . , i14, i15 are stored in input vectors IV1, IV2, and IV3 to generate the four output data points. Thus, as the four input data point components of each input vector IVj are read, portions of each temporary vector can be generated according to the following relationships:

$$TV8=TV8+IVj*KV(j-1)$$

$$TV9=TV9+IVj*KV(3+j-1)$$

$$TV10=TV10+IVj*KV(6+j-1)$$

$$TV11=TV11+IVj*KV(9+j-1)$$

where each equation represents a float4 multiplication of two vectors and a vector summation, which can be performed as a single operation by a GPU. After all three input vectors IV1, IV2, and IV3 have been read, and used to create TV8, TV9, TV10, and TV11, the temporary vectors can be converted to corresponding output data values using the following dot product relationships:

$$o8=dot(TV8,[1,1,1,1])$$

$$o9=dot(TV9,[1,1,1,1])$$

$$o10=dot(TV10,[1,1,1,1])$$

$$o11=dot(TV11,[1,1,1,1])$$

As well, the output data points themselves can be stored in a corresponding output data vector.

The foregoing example clearly illustrates the advantage of systems and methods according to the invention. While prior art implementations of the type described earlier require nine read accesses for each output pixel produced, convolutions filters according to the invention require twelve reads for four output pixels, i.e., three reads per output pixel. This three-fold improvement in memory bandwidth utilization results in significantly improved performance. In addition, reading four pixels at a time decreases the number of texture reads and instructions within the shader, which are both limited on some architectures. This becomes increasingly important when processing multiple lines of the filter per pass in multi-dimensional filters.

In preferred embodiments of the invention, e.g., implementations of a 9×1 convolution according to the invention as described above, the filter kernel is encoded as constants in registers in pixel shaders of the GPU. Where this is not possible or not desired, e.g., for very large kernels, the kernel can be stored in a separate texture. Note that respective memory bandwidth savings apply for the kernel read access as well in the fast implementation.

General Kernel Sizes

Those skilled in the art will appreciate that systems and methods according to the invention are not restricted to 9×1 kernels nor to one dimensional kernels. For a given kernel size there are often different possible patterns of output aggregation. For illustration some examples are listed below:

| Kernel Size | # of Pixels Computed Simultaneously | # of Pixels Pixel Read to Produce One Chunk of Output | Memory Bandwidth Compared to Simple Implementation |
| --- | --- | --- | --- |
| 9 × 1 | 4 | 12 | 33% |
| 9 × 1 | 16 | 24 | 17% |
| 5 × 5 | 4 (2 × 2) | 36 (6 × 6) | 36% |
| 5 × 5 | 16 (4 × 4) | 64 (8 × 8) | 16% |
| 9 × 9 | 16 (16 × 1) | 216 (24 × 9) | 17% |
| 9 × 9 | 16 (4 × 4) | 144 (12 × 12) | 11% |

The choice of the configuration for a given kernel size depends on the specific GPU hardware and driver software used. For example, GPUs currently available in the marketplace have limitations with respect to the maximum number of simultaneous outputs supported, e.g. four render targets of at most four channels each, i.e., sixteen simultaneous outputs. Furthermore the maximum number of instructions allowed in a pixel shader, the maximum number of constants or registers available to store the kernel values, the particular memory and cache subsystem design, the available input and output data type formats, as well as other properties of the GPU hardware and driver software influence performance. Therefore, where optimal performance is required, the best possible configuration for a given platform is determined by thorough analysis or empirically by benchmarking the different possible configurations. Such benchmark can be performed at run time.

It should be pointed out that the filtered image computed via GPU-based convolution according to the invention will be distributed across multiple render targets and/or across the RGBA tuples of a four-component render target. For many subsequent operations this is not a restriction. For example, for direct display it doesn't matter if the intensity values to be displayed are read from a single one-component texture or from multiple input textures, possibly with packed RGBA tuples. Where necessary, the filtered image can be copied into a single one-component texture in an additional render pass.

Generalization to 1D, 3D and Higher Dimensions

The described method can be generalized to 1D convolution by choosing the input and output images to be one pixel high. However, still further improved methods are provided for the case that multiple one dimensional convolutions need to be performed on input vectors of the same size. In these cases, it can be advantageous to store multiple lines in one input image and, then, to process that image in the manner described above as a convolution of a 2D input image with a 1D kernel. Because of the memory cache design and the way parallel execution of pixel shaders occurs on current generation GPU hardware, this can increase performance.

In order to generalize to 3D or higher dimensionalities, 3D or higher dimensional input textures are used. Since current-generation GPU hardware does not necessarily support 3D or higher dimensional input textures, a set of n lower dimensional textures can be used instead, or multiple slices of a volume can be packed into a lower dimensional texture in a tile-like fashion. The same applies to the output (render targets).

Separable Kernels

Embodiments of the invention can be configured to treat still more efficiently separable filter kernels, i.e., ones that can be written in the form of $$K(x,y)=K_x(x)K_y(y)$$

In such a case the convolution with the 2D filter kernel is equivalent to a 1D convolution of the rows of the image with $K_x(\cdot)$, followed by a 1D convolution of the columns with $K_y(\cdot)$. As described in the previous section the proposed method applies to 1D convolutions as well. Therefore, an efficient implementation for separable kernels is possible, by using the result of the row-wise convolution as input to a second column-wise convolution.

In some embodiments, the output of the first pass (row-wise convolution) is distributed across multiple render targets and/or stored in RGBA tuples that span multiple horizontally neighboring pixels. This has to be taken into account for the second pass (column-wise convolution). It can be done by either reading from multiple render targets, or by operating on those horizontal RGBA tuples and thereby computing the convolution for four columns at once, or by performing an intermediate data reorganization pass.

Depending on kernel size, image size and hardware architecture, a further performance improvement is achieved in some embodiments by first computing the row-wise convolution, transposing the image, then performing a second row-wise convolution with Ky, followed by another transpose operation.

The same applies to separable 3D or higher dimensional filter kernels.

Constant Filter Kernels

Embodiments of the invention can also be configured to process still more efficiently cases involving constant filter kernels. Here the result of the convolution is the (scaled) average of the neighbours of a pixel in a neighborhood of size $N_x^K \times N_y^K$.

The methods for convolution with constant filter kernels described below can, like those discussed above, be implemented in an imaging and digital processing environment of the type disclosed in copending, commonly assigned U.S. patent application Ser. No. 10/756,172, filed Jan. 12, 2004, entitled Improved Methods and Apparatus for Back-Projection and Forward-Projection, and specifically, in FIG. 1 thereof and the corresponding text, e.g., at page 7, line 14 through page 8, line 26, the teachings (including illustration) of which are incorporated herein by reference. And, again, although that figure and the text refer, by way of example, to mammography systems and computed tomosynthesis, it will be appreciated that the invention hereof and its embodiments are more broadly applicable to the full range of medical (and non-medical) imaging applications and techniques, such as, by way of non-limiting example, geo-sciences, or microscopy, computer tomographs, magnetic resonance imaging devices, or confocal microscopes, to name just a few.

A constant filter kernel is always separable. We therefore first focus on one dimensional kernels again. An interesting observation is that the output value of a pixel can be computed from the output value of its left neighbour with only a small correction term, as expressed by the following relation:

$$o(x, y) = \sum_{i=0}^{N_x^K-1} K \, I\left(x + i - \left\lfloor \frac{N_x^K - 1}{2} \right\rfloor, y\right), K = const \Rightarrow o(x, y) = \quad (2)$$

$$o(x-1, y) + K \, I\left(x + \left\lfloor \frac{N_x^K}{2} \right\rfloor, y\right) - K \, I\left(x - 1 - \left\lfloor \frac{N_x^K - 1}{2} \right\rfloor, y\right)$$

Of course, the processing does not necessarily need to proceed from left to right, but may also be right to left. Additionally, the other dimension can also be processed first (top to bottom or bottom to top). For illustrative purposes, in the present description, we'll choose a left-to-right implementation for the first pass and a top-to-bottom implementation for the second pass.

By taking advantage of this observation, a recursive computation scheme can be implemented which in the limit, only requires two memory reads and two additions per output pixel. In particular for larger filter kernels this can be a significant saving compared to straight-forward computation of each output pixel independently. This optimization is well known for central processor unit-based (CPU) implementations and is often referred to as the boxcar algorithm. The implementation of the boxcar filter on a GPU, however, is not straightforward because outputs are generated in parallel and out-of-order on the GPU. Simply reading the left neighbour will produce erroneous results since it may not have been computed yet. The following describes the convolution of a 2D image with a $N_x^K \times 1$ constant filter kernel, ensuring a correct order of processing, generation of correct results and excellent performance.

Embodiments of the invention implementing the boxcar filter force generation of the output pixels in a defined sequential order. Whereas a simplistic implementation of this type of algorithm would be to draw one (or few) large polygons to cover the entire render target and read the left result within the pixel shader, this produces erroneous results in the case of a GPU because of the inherent out-of-order processing of the GPU. The solution provided in embodiments of the invention is to draw vertical lines from left to right covering one column of the render target each:

1. Define image I(x,y) as input texture $N_x \times N_y$
2. Define a render target (output) of same size
3. Define render target as second input texture
4. Initialize column 0 (leftmost) of render target with correct output values
5. For column 1 ... $N_x-1$ do
   a. For each pixel o(x,y) in that column do
      i. Read value o(x-1,y) from render target (second input texture)
      ii. Read $$i_1 = I\left(x + \left\lfloor \frac{N_x^K}{2} \right\rfloor, y\right)$$

and $$i_2 = I\left(x - 1 - \left\lfloor \frac{N_x^K - 1}{2} \right\rfloor, y\right)$$

iii. Write out $o(x,y) = o(x-1,y) + i_1 - i_2$

It will be appreciated that the pixels are processed in left-to-right order, because the computation of one output pixel value relies on the previously computed value for its left neighbour. Depending on the specific hardware and drivers used, sending lines into the graphics pipeline in left-to-right order may not guarantee the right processing order on the pixel level. Current GPUs have a large number of pixel shaders that compute output pixels simultaneously. The order and pattern in which those pixels are computed varies with hardware and driver types and versions and is currently not defined in API standards like DirectX or OpenGL.

Listed below are multiple ways to force correct execution order. Which one is the most efficient depends on the specific hardware and driver.

1. A "flush" command can be sent after each line drawn.
2. Standard graphics APIs allow the insertion of "fence tokens" into the stream of commands that is sent to the GPU, which can be queried to detect whether the stream up to the "fence token" has been processed. This way the completion of the processing of a column can be detected, so that the next one can be started. In some driver versions the insertion of such fences into the stream without querying is sufficient to force sequential execution.
3. Instead of one render target, two can be used. The render targets would be swapped after each line draw, so that so that the GPU is never reading from the render target it is currently writing to.

4. On some architectures it can be most efficient to use a scheme without rigid synchronization, so that wrong execution order can sporadically happen. For such implementations a pixel shader can be used which determines whether the neighbour pixel it reads contains a valid value already. This can be achieved by initializing the render target with some non-occurring default value (like −1). If this value is ever read for the previous result, the shader would not produce any output value. A query counter as provided for example by the OpenGL ARB_occlusion_query extension can be used to determine the number of successful shader operations. Thus, while not all output pixels have been computed additional render passes could be performed to compute the values for the missing pixels.
5. After each line, some dummy geometry can be issued.
6. One can choose to work with multiple advancing fronts, as described in the next subsection, so that the assignment of pixel shaders to pixel output computations is performed in a way that avoids incorrect execution order. The exact number of divisions of the output to achieve this depends on the specific hardware and driver. Typical numbers are 4, 8, or 16 for the current generation of hardware. Working this way can also improve performance if one of the other described methods are used to enforce sequential execution.

Multiple Lines at Once

The parallelization in the GPU can in some cases be more efficient if the following modified method is used: Instead of only initializing the left-most column, multiple columns, spread across the image are initialized. Then, the recursive computation is performed by drawing lines advancing from these seedlines. Example: For an image with 100 columns one can have four simultaneously advancing fronts by initializing columns 0,24,49,74 and then drawing columns 1,25,50, 75,2,26,51,76,

Such a methodology can not only improve performance, but also help avoiding execution order issues, as pointed out above.

Encoding the Filter Kernel in the Texture Address

In the embodiments described above, the input data has been point sampled and the kernels applied by a discrete multiplication within the pixel shader's vector processor. The GPU also includes hardware which is able to perform various filtering operations before the data is read into the vector processors. This hardware filtering can be taken advantage of to decrease the number of instructions in the filter code, leveraging additional hardware in the graphics device and further accelerating the filtering process. Additionally, since this operation is performed outside the pixel shader, these calculation may be carried out in parallel with calculations occurring within the pixel shader.

If the two adjacent filter kernel elements $K_n$ and $K_{n+1}$ are both between 0 and 1 (inclusive) and sum to 1, $K_{n+1}$ can be used as the pixel address offset from the center of pixel $P_m$. If linear interpolation is then enabled in the sampler, the net effect is that the pixel read into the shader is $P_m*K_n+P_{m+1}*K_{n+1}$. This operation is performed in hardware prior to the data entering the pixel shader's vector registers and does not require any pixel shader instructions.

If the adjacent kernel values do not meet the aforementioned range and sum criteria, a scaling can be performed to enable this method. If we define S to be $S=1/(K_n+K_{n+1})$, then the address offset is $S*K_{n+1}$, which again would be calculated in the vertex shader (no additional instructions in the pixel shader). This does however, require that a multiplication by the constant 1/S be performed within the pixel shader to recover the result. Even with the introduction of this multiplication, this still results in fewer instructions then discretely reading the two samples, performing two multiplications and an add.

This method can be used to calculate an entire 1D convolution in a single pass: the vertex shader calculates the appropriate addresses for each kernel pair and they are passed through to the pixel shader. The pixel shader then performs a single sample for each kernel pair, summing the result and performing the 1/S multiplications where necessary.

Since the GPU can perform linear interpolation in multiple dimensions (e.g., 1D, 2D and 3D as described above), this method is readily extensible to higher dimensions. Additionally, as GPUs add additional hardware to perform more complex filtering in hardware, this method can be employed if the kernel accommodates it.

A further understanding of the foregoing may be appreciated by reference to the following publications, the teachings of which are incorporated herein by reference, the citation of which is not intended as, nor shall it be deemed, an admission that any or all of them is/are prior art: I. Viola, A. Kanitsar, E. Gröller, Hardware-Based Nonlinear Filtering and Segmentation using High-Level Shading Languages, Technical Report TR-186-2-03-07, May 2003, Vienna University of Technology; M. Hopf, T.Ertl, Accelerating 3D Convolution using Graphics Hardware, Proc. IEEE Visualization 1999, pp 471-474.

Described above are methods and apparatus meeting the objects set forth herein. Those skilled in the art will appreciate that the embodiments described above are merely examples of the invention and that other embodiments, incorporating changes thereto, fall within the scope of the invention. Thus, for example, it will be appreciated that in the embodiments described above, the GPU serves as a coprocessor, operating under the control of a CPU. Other embodiments of the invention employ multiple GPUs for this purpose, each responsible for a respective portion of processing. Still other embodiments use no GPU at all, relying on other types of processing elements (such as array processors, game engine processors, and so forth) to provide or supplement such processing, all in accord with the teachings hereof. In embodiments which use GPUs, e.g., as described above, preferred such devices are of the variety having programmable vertex shaders and programmable pixel shaders and are commercially available in the marketplace from ATI Research (for example, the Radeon™ 9700 processor), Nvidia (for example, the GeForce™ FX and Quadro® processors) and/or otherwise compatible with methods according to the invention discussed herein.

What is claimed is:

1. A method for simultaneously convolving a plurality of digital image data points into output data distributed in multi-channel output targets, comprising: at least one processor implementing the following step of:
   A. multiplying a plurality of imaging data points from at least a portion of an input matrix with corresponding filter values to produce components of a plurality of output data points simultaneously;
   B. updating corresponding output targets with the components of the plurality of output data points from step (A), each output target having a plurality of channels; and
   C. repeating steps (A) and (B) until the output targets contain output data corresponding with convolved imaging data points from the input matrix.

2. The method of claim 1 wherein each output target is a target vector, the method further comprising:
D. converting target vectors into output data points.

3. The method of claim 2, further comprising:
E. transferring the output data points from the render target to a one-component texture map.

4. The method of claim 2, wherein the output data points are stored in a render target matrix with at least one dimension equal to a dimension of the input matrix divided by a number corresponding with the plurality of channels.

5. The method of claim 1, wherein the plurality of imaging data points are stored as an image data vector and the filter values are stored as a kernel vector.

6. The method of claim 1, wherein steps (A), (B), and (C) are performed using a graphics processing unit.

7. The method of claim 6, wherein the graphics processing unit has at least four channels.

8. The method of claim 6, wherein the graphics processing unit performs steps (A) and (B) in one operation.

9. The method of claim 1, wherein the filter values are stored as at least one constant in pixel shaders of a graphics processing unit.

10. The method of claim 1, wherein the input matrix comprises one-dimensional imaging data.

11. The method of claim 10, wherein the one-dimensional imaging data is configured as a plurality of equally-sized input vectors that are arranged in a two-dimensional input matrix that is processed simultaneously.

12. The method of claim 1, wherein the imaging data comprises a data set having at least three dimensions, the input matrix configured as at least one slice of the imaging data.

13. The method of claim 1, wherein the imaging data comprises data from at least one of microscopy, computer tomographs, magnetic resonance images, and confocal microscopes.

14. A method for convolving digital image data with filter values that are the product of dimensionally-separable functions into output data distributed in multi-channel output targets, comprising: at least one processor implementing the following step of:
convolving first values generated from a first dimensionally-separable filter function with at least a portion of an input matrix holding the digital image data to produce a first convolution output in a render target having a plurality of channels, the convolving being performed as one or more one-dimensional convolutions; and
convolving second values generated from a second dimensionally-separable filter function with the first convolution output to produce a second convolution output, the convolving being performed as one or more one-dimensional convolutions.

15. The method of claim 14, wherein the steps of convolving comprise:
A. multiplying a plurality of imaging data points with corresponding filter function values to produce components of a plurality of corresponding convolution output points simultaneously;
B. updating corresponding convolution output targets with the components of the plurality of corresponding convolution output points from step (A), each convolution output target having the plurality of channels; and
C. repeating steps (A) and (B) until the corresponding convolution output targets contain data corresponding with the plurality of corresponding convolution output points.

16. The method of claim 14, wherein the steps of convolving are performed on a graphics processing unit.

17. The method of claim 14, further comprising:
rearranging the first convolution output before convolving second values with the first convolution output.

18. The method of claim 17, wherein rearranging the first convolution output includes transposing a matrix having the first convolution output before convolving second values with the first convolution output.

19. A method for convolving digital image data with a one-dimensional filter having a constant value to produce output data distributed in multi-channel output targets, comprising: at least one processor implementing the following step of:
A. convolving a plurality of image data points located in a row or a column of an image matrix with the one-dimensional filter to produce a plurality of output values in a render target having a plurality of channels; and
B. calculating a new plurality of output values for the render target from at least the previous plurality of output values, the new plurality of output values located adjacent to the image data points used to produce the previous plurality of output values.

20. The method of claim 19, wherein the step of convolving comprises:
A. multiplying a plurality of imaging data points with corresponding filter values to produce components of the plurality of output values simultaneously;
B. updating corresponding render target values with the components of the plurality of the plurality of output values from step (A); and
C. repeating steps (A) and (B) until the corresponding render target values contain data corresponding with convolved image data points.

21. The method of claim 19, wherein for the step of calculating the new plurality of output values, each new output value o(x) is given by the formula:

$$o(x) = o(x-1) + K \cdot I\left(x + \left\lfloor \frac{N_x^K}{2} \right\rfloor\right) - K \cdot I\left(x - 1 - \left\lfloor \frac{N_x^K - 1}{2} \right\rfloor\right)$$

and further wherein
o(x−1) is a previous output value located at a position adjacent to the new output value; I(x) represents an image data point in the image matrix at a particular location x, K is the constant filter value; and $N_x^K$ represents a size of the image matrix in the x dimension.

22. The method of claim 19, wherein steps (A) and (B) are performed on a graphics processing unit with the plurality of channels.

23. The method of claim 19, wherein steps (A) and (B) are repeated until the image data points of the image matrix are all convolved into output values.

24. The method of claim 19, further comprising:
sending a flush command after convolving the plurality of image data points and calculating the new plurality of output values.

25. The method of claim 19, further comprising:
inserting a fence token after convolving the plurality of image data points and calculating the new plurality of output values.

26. The method of claim 19, wherein the step of convolving the plurality of image data points includes producing the plurality of output values in at least two separate render targets each having the plurality of channels, and further wherein the step of calculating the new plurality of output values includes writing the new plurality of output values to a separate render target than used to obtain the previous plurality of output values.

27. The method of claim 19, further comprising:
initializing the render target with a non-occurring default value, before the step of convolving the plurality of image data points, and
preventing production of a new output value in the render target when an adjacent output value is read and has the non-occurring default value.

28. The method of claim 19, further comprising:
issuing a dummy geometry after convolving the plurality of image data points and calculating the new plurality of output values.

29. The method of claim 19, wherein the step of convolving the plurality of image data points includes convolving the plurality of image data points located in a plurality of rows or columns of the image matrix.

* * * * *

UNITED STATES PATENT AND TRADEMARK OFFICE
CERTIFICATE OF CORRECTION

PATENT NO.        : 7,623,732 B1                                        Page 1 of 1
APPLICATION NO.   : 11/411999
DATED             : November 24, 2009
INVENTOR(S)       : Thieret et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 796 days.

Signed and Sealed this

Twenty-sixth Day of October, 2010

David J. Kappos
*Director of the United States Patent and Trademark Office*